(12) United States Patent
Arumugam et al.

(10) Patent No.: US 11,100,009 B2
(45) Date of Patent: Aug. 24, 2021

(54) INTELLIGENT DETECTION AND EJECTION OF UNUSED APPLICATION COMPONENTS

(71) Applicant: Bank of America Corporation, Charlotte, NC (US)

(72) Inventors: Rajalakshmi Arumugam, Chennai (IN); Sesharamanujam Padmanabhan, Chennai (IN); Kiran Subramanyam Darbha, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 58 days.

(21) Appl. No.: 16/733,767

(22) Filed: Jan. 3, 2020

(65) Prior Publication Data
US 2021/0209033 A1  Jul. 8, 2021

(51) Int. Cl.
| | |
|---|---|
| *G06F 12/123* | (2016.01) |
| *G06F 11/30* | (2006.01) |
| *G06F 12/122* | (2016.01) |
| *G06F 8/61* | (2018.01) |
| *G06F 11/32* | (2006.01) |
| *G06F 12/02* | (2006.01) |

(52) U.S. Cl.
CPC .............. *G06F 12/123* (2013.01); *G06F 8/62* (2013.01); *G06F 11/3037* (2013.01); *G06F 11/324* (2013.01); *G06F 12/0246* (2013.01); *G06F 12/122* (2013.01)

(58) Field of Classification Search
None
See application file for complete search history.

(56) References Cited

U.S. PATENT DOCUMENTS

| | | | |
|---|---|---|---|
| 6,247,175 B1 | 6/2001 | Ledford et al. | |
| 6,701,381 B2 | 3/2004 | Hearne et al. | |
| 7,124,272 B1* | 10/2006 | Kennedy | G06F 3/0613 |
| | | | 711/173 |
| 7,480,893 B2 | 1/2009 | Berenbach et al. | |
| 7,512,942 B2 | 3/2009 | Brown et al. | |
| 7,590,599 B2 | 9/2009 | Xia et al. | |
| 7,627,671 B1 | 12/2009 | Palma et al. | |
| 7,681,176 B2 | 3/2010 | Wills et al. | |
| 7,761,848 B1 | 7/2010 | Chaffin | |
| 7,823,120 B2 | 10/2010 | Kazakov et al. | |
| 7,885,793 B2 | 2/2011 | Padmanabhan | |

(Continued)

FOREIGN PATENT DOCUMENTS

| | | |
|---|---|---|
| CA | 2734199 C | 1/2017 |
| CN | 101689111 A | 3/2010 |

(Continued)

*Primary Examiner* — Nathan Sadler
(74) *Attorney, Agent, or Firm* — Michael A. Springs (57) ABSTRACT

An application monitoring system for identifying and removing unused components from memory associated with an application. Embodiments identify a range, a set of historical logs associated with the range, and components in each historical log. Each component is classified based on a frequency of use of the component, the most recent time the component was used, the number of periods between the most recent use of the component and the range end point, and the number of periods between the most recent use of the component and the previous use of the component. Unused and rarely used components are isolated or removed from the memory.

13 Claims, 6 Drawing Sheets

(56) References Cited

U.S. PATENT DOCUMENTS

| | | |
|---|---|---|
| 7,890,951 B2 | 2/2011 | Vinberg et al. |
| 7,917,890 B2 | 3/2011 | Barcellona |
| 7,926,051 B2 | 4/2011 | Berta et al. |
| 7,949,997 B2 | 5/2011 | Chessell et al. |
| 8,010,946 B2 | 8/2011 | Zaky et al. |
| 8,069,434 B2 | 11/2011 | Ploesser et al. |
| 8,156,473 B2 | 4/2012 | Heidasch |
| 8,271,934 B2 | 9/2012 | Carteri et al. |
| 8,365,165 B2 | 1/2013 | Rao |
| 8,418,185 B2 | 4/2013 | Hoff et al. |
| 8,464,208 B2 | 6/2013 | Feigen |
| 8,516,435 B2 | 8/2013 | Akkiraju et al. |
| 8,549,514 B2 | 10/2013 | Carteri et al. |
| 8,572,586 B2 | 10/2013 | Gass et al. |
| 8,584,100 B2 | 11/2013 | Xu et al. |
| 8,640,110 B2 | 1/2014 | Kopp et al. |
| 8,739,150 B2 | 5/2014 | Gass et al. |
| 8,813,024 B2 | 8/2014 | Akkiraju et al. |
| 8,843,883 B2 | 9/2014 | Chowdhary et al. |
| 8,856,724 B2 | 10/2014 | Somani et al. |
| 8,898,627 B2 | 11/2014 | Gass et al. |
| 8,918,501 B2 | 12/2014 | Feinberg et al. |
| 8,918,776 B2 | 12/2014 | Fei et al. |
| 8,954,375 B2 | 2/2015 | Kehoe et al. |
| 8,959,481 B2 | 2/2015 | Anand et al. |
| 9,208,057 B2 | 12/2015 | Valdiviezo Basauri et al. |
| 9,508,039 B2 | 11/2016 | Arnold et al. |
| 9,727,318 B2 | 8/2017 | Naveh et al. |
| 10,102,107 B2 | 10/2018 | Darbha et al. |
| 2005/0102867 A1 | 5/2005 | Barta et al. |
| 2006/0064867 A1 | 3/2006 | Freitas |
| 2007/0240127 A1 | 10/2007 | Roques et al. |
| 2008/0270974 A1 | 10/2008 | Topchiyski et al. |
| 2008/0276229 A1 | 11/2008 | Hawkins et al. |
| 2010/0017505 A1* | 1/2010 | Kamada ............... G06F 8/62<br>709/221 |
| 2010/0114828 A1 | 5/2010 | Adler et al. |
| 2012/0159434 A1 | 6/2012 | Dang et al. |
| 2013/0275954 A1 | 10/2013 | Zhang |
| 2015/0062736 A1* | 3/2015 | Kim ............... G11B 20/1252<br>360/48 |
| 2015/0370428 A1* | 12/2015 | Chan ............... G06F 3/04842<br>715/739 |
| 2020/0167444 A1* | 5/2020 | Singri ............... G06F 8/65 |

FOREIGN PATENT DOCUMENTS

| | | |
|---|---|---|
| CN | 102656557 A | 9/2012 |
| EP | 2065799 A1 | 6/2009 |
| JP | 2005078650 A | 3/2005 |
| JP | 2009515252 A | 4/2009 |
| JP | 5165591 B2 | 3/2013 |
| JP | 5671207 B2 | 2/2015 |
| KR | 20040079336 A | 9/2004 |
| WO | 2009140154 A1 | 11/2009 |

* cited by examiner

INTELLIGENT DETECTION AND EJECTION OF UNUSED APPLICATION COMPONENTS

TECHNICAL FIELD

The present disclosure relates generally to application security, and more specifically to application monitoring systems for identifying components associated with an application, determining a usage of the components by the application, and removing or isolating unused components while allowing continued operation of the application.

BACKGROUND

A system running an application may execute various scripts, job files and other executable components stored in an application memory, with each of these executable components referencing information in parameter files, table, databases and other reference components stored in the application memory. Over time, changes to the functionality of the application require additional components or modifications to executable components and reference components. These components are often times allowed to remain in application memory either because their relationship with other components is unknown or due to a concern that deletion may negatively impact execution of the application. As a result, the application memory needed to store components grows until it exceeds a memory limit. Even if more memory is allocated, adding new components while retaining unused components and older versions of components grows the application memory, making the application memory more complex.

SUMMARY

The system disclosed in the present application provides technical solutions to the technical problems discussed above by identifying and quarantining unused components from components still relevant to the application. The disclosed system provides several practical applications and technical advantages which include 1) assessing the relevance of components in memory associated with an application, 2) identifying components that are not used by the application, 3) quarantining unused components from active components to prevent conflicts with an application, and 5) maintaining memory associated with the application below a threshold size.

An application monitoring system analyzes the usage of components by an application to determine if the components are being used by the application. If the components are being used, the application monitoring system ensures they remain in memory accessible by the application. Any components not being used by the application may be quarantined from the memory to reduce the amount of memory needed to support the application and to reduce the likelihood that an unused component negatively impacts the application.

Analyzing the usage of a component may include determining how frequently the component is used by the application, determining how recently the component was used by the application, how many periods have passed since the last use of the component, and how many periods separate the last use of the component from the previous use of the component.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

An application executing on a computing system uses various scripts, files and other components by calling them from a memory. Over time, application developers might add components or modify existing components to broaden and improve functionality or to meet requirements of the application. As components are added or modified, the memory needed to support the application increases and the complexity of managing the memory storing the components also increases. Initially, the complexity of managing the memory may be low, but the cost to add more memory may be less. As the number of components increases, cost to increase memory may also increase but the relationships between components makes any attempt to clean up the memory more difficult. For example, if an application uses a first script referring to a parameter file and a second script is added to replace the first script, the first script is not used by the application. However, if the first script is allowed to remain in memory, the first script occupies some memory and its relationship with the parameter file represents a risk to the application. Accordingly, the first script should be checked to determine if it calls other scripts or executable components or if it refers to files, tables, or other reference components (downstream connectivity). If there is any downstream connectivity, these components also should be checked to determine if the application needs these components or if they are also being replaced. Furthermore, the application should be analyzed to determine if other components refer to the first script, as well as determine if any components referenced by the first script are also referenced by other components still used by the application (upstream connectivity). Once a component and all components referencing or referenced by the component have been checked to ensure no upstream or downstream connectivity issues exist, the component can be removed from memory. As can be seen from this example, the steps needed to remove a component from the memory may be time and labor intensive.

To overcome these technical problems, embodiments disclosed herein analyze the usage of components associated with an application. If a component is used by the application, the component is maintained in memory for ongoing use. If a component is not used, embodiments may quarantine the component or delete the component from the memory.

I. System Overview

Figure 1:
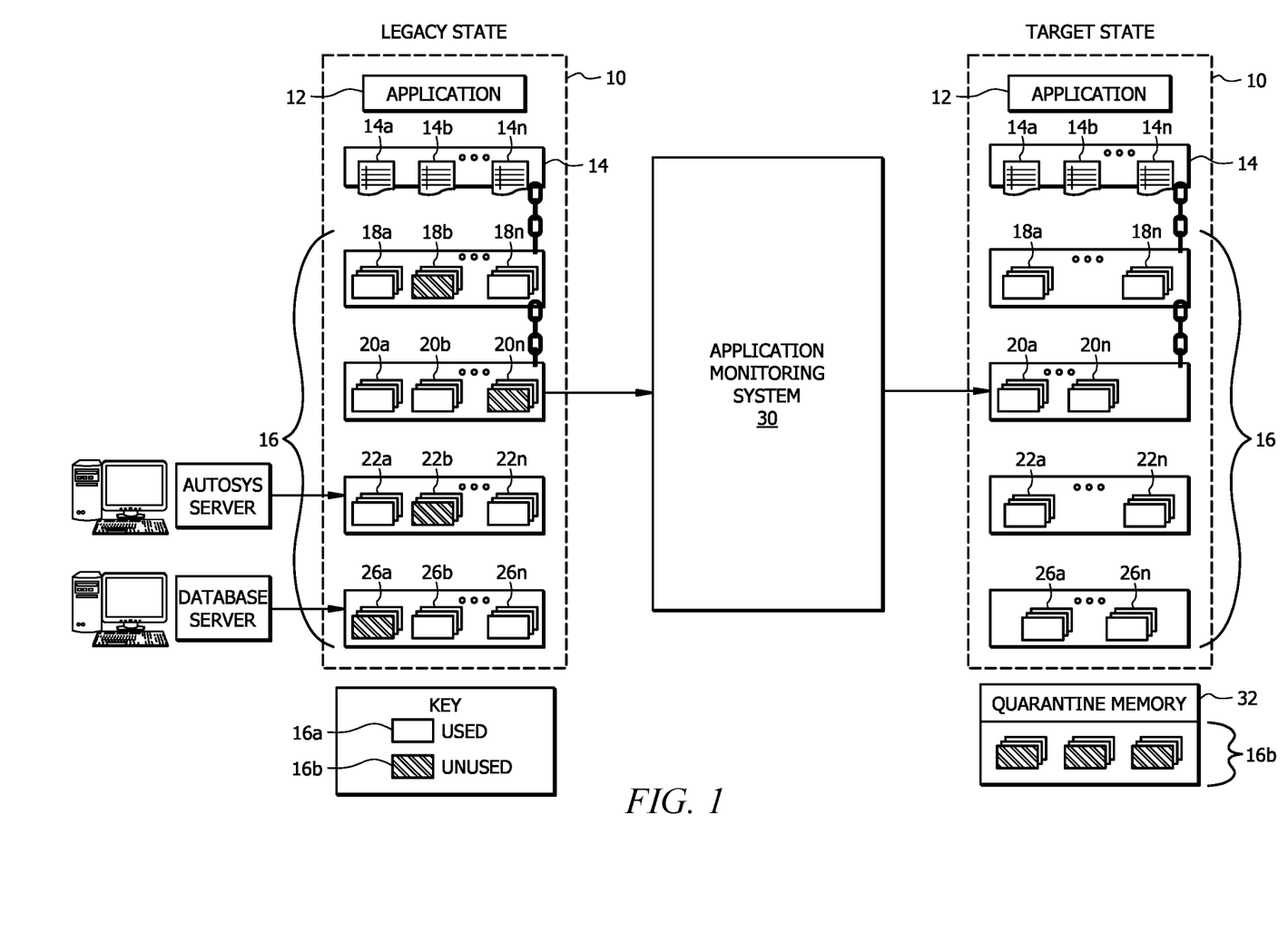
FIG. 1 illustrates a computing environment with a memory associated with an application in both a legacy state and a target state, with an application monitoring system configured to transition the memory from the legacy state to the target state.

FIG. 1 illustrates a computing environment with a memory 10 associated with an application 12 in a legacy state and a target state. In both the legacy state depicted on the left side and the target state depicted on the right side, memory 10 contains application 12 as well as execution logs 14a-14n (collectively referred to as execution history 14) associated with application 12 and components 16 associated with application 12.

Components 16 include executable components and reference components. Examples of executable components may include, but are not limited to, script files 18a-18n and Autosys jobs 22a-22n. Reference components may include, but are not limited to, parameter files 20a-20n, Job Information Language (JIL) files, and structured query language (SQL) data definition language (DDL) files 26a-26n used to describe the tables, records, columns and other fields in the structure of a database.

In the legacy state on the left side and referencing the key, components 16 in memory 10 include used components 16a that are relevant and used by application 12, as well as unused components 16b that are not relevant to application 12. As discussed above, the continued storage of unused components 16b increases the amount of memory 10 needed to support application 12 and presents a risk to application 12.

In the target state depicted on the right side, components 16 in memory 10 include only used components 16a. In particular, some components 16a in memory 10 are used by application 12 and should remain in memory 10. However, other components 16b are not used by application 12 and should be removed. A component 16b may be unused because another component 16a was added, or component 16b may be unused because application 12 was modified to refer to another component 16a such that functionality for component 16b is no longer needed.

Ideally, any unused components 16b that are not used by application 12 are removed from memory 10. However, manually removing unused components 16b is a tedious process and can lead to uncertain impacts on application 12.

To solve these technical problems, in between memory 10 in the legacy state and memory 10 in the target state is application monitoring system 30 configured to transition memory 10 from the legacy state to the target state by identifying which components 16 in memory 10 should be maintained in memory 10 as used components 16a and identifying any components 16 in memory 10 that should be quarantined as unused components 16b and stored in quarantine memory 32 separate from memory 10.

Application monitoring system 30 is configured to identify components 16 in memory 10 and analyze component usage to determine if the component 16 is used or unused. If component 16 is used, component 16 is identified as a used component 16a and remains in memory 10 for use by application 12. Otherwise, if application monitoring system 30 determines component 16 is rarely used or unused, component 16 is identified as an unused component 16b and is quarantined or removed from memory.

II. Analysis of Components Based on Usage—Overview

Each component 16 in memory 10 is associated with a usage period during which application 12 is expected to use component 16 at least once. Usage periods include, but are not limited to, daily, weekly, monthly, quarterly, semi-annually and annually. For example, script file 18a may be associated with a daily usage period such that application 12 is expected to call script file 18a daily. Some components 16 may be referenced by other components 16 during an execution instance and have a usage period based on usage period of the referring component 16. For example, if script file 18a is associated with a daily usage period and references parameter file 20a, then parameter file 20a may also be associated with a daily usage period.

Each time application 12 is executed, application 12 is expected to use a set of components 16 but is unlikely to use all components 16 in every execution. To maintain a record of which components 16 are used by application 12, execution history 14 recorded in memory 10 includes a historical log 14a-14n for each execution of application 12. Generally, each historical log 14a-14n contains a record of all components 16 used by application 12 during one execution of application 12, and further includes a tag such as a time/data stamp. Still referring to FIG. 1, historical log 14a comprises a record of all components 16 used by application 12 during a first execution of application 12, second historical log 14b comprises a record of all components 16 used by application 12 during a second execution of application 12, and the nth historical log 14n comprises a record of all components 16 used by application 12 during the nth execution of application 12. By searching historical logs 14a-14n to determine how often a component 16 was used by application 12 during a specified range, embodiments assess whether component 16 should be classified as a used component 16a to maintain in memory 10 or classified as an unused component 16b for quarantining from memory 10.

III. Application Monitoring System

Figure 2:
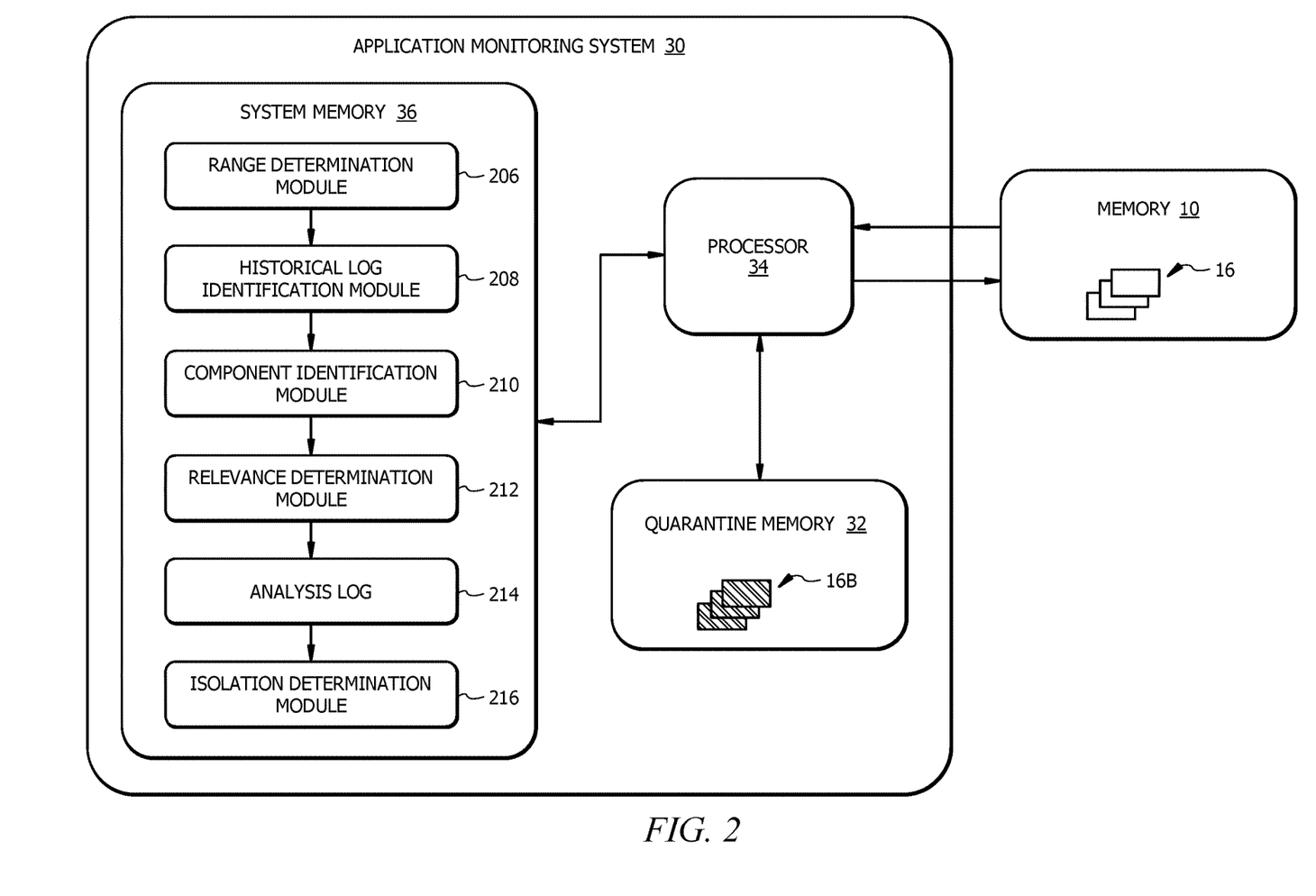
FIG. 2 is an architectural diagram of an application monitoring system configured to remove unused components from the memory.

FIG. 2 is an architectural diagram of an intelligent application monitoring system 30 configured to identify components in memory 10 and categorize components 16 according to usage by application 12. As seen in FIG. 2, application monitoring system 30 includes a processor 34 communicatively coupled to system memory 36, memory 10 and quarantine memory 32.

Processor 34 is configured to perform any of the functions of application monitoring system 30 described herein. Processor 34 is any electronic circuitry, including, but not limited to microprocessors, application specific integrated circuits (ASIC), application specific instruction set processor (ASIP), and/or state machines, that controls the operation of application monitoring system 30. Processor 34 may be 8-bit, 16-bit, 32-bit, 64-bit or of any other suitable architecture. Processor 34 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 34 may include other hardware and software that operates to control and process information. Processor 34 executes software stored on memory to perform any of the functions described herein. Processor 34 controls the operation and administration of application monitoring system 30. Processor 34 may be a programmable logic device, a microcontroller, a microprocessor, any suitable processing device, or any suitable combination of the preceding. Processor 34 is not limited to a single processing device and may encompass multiple processing devices.

System memory 36 may store, either permanently or temporarily, data, operational software, or other information for processor 34. System memory 36 may include any one or a combination of volatile or non-volatile local or remote devices suitable for storing information. For example, system memory 36 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in system memory 36, a disk, a CD, or a flash drive. In particular embodiments, the software may include an application executable by processor 34 to perform one or more of the functions described herein. The manner by which application monitoring system 30 performs such tasks will be described in further detail below, in the discussion of FIGS. 3 through 6.

Figure 3:
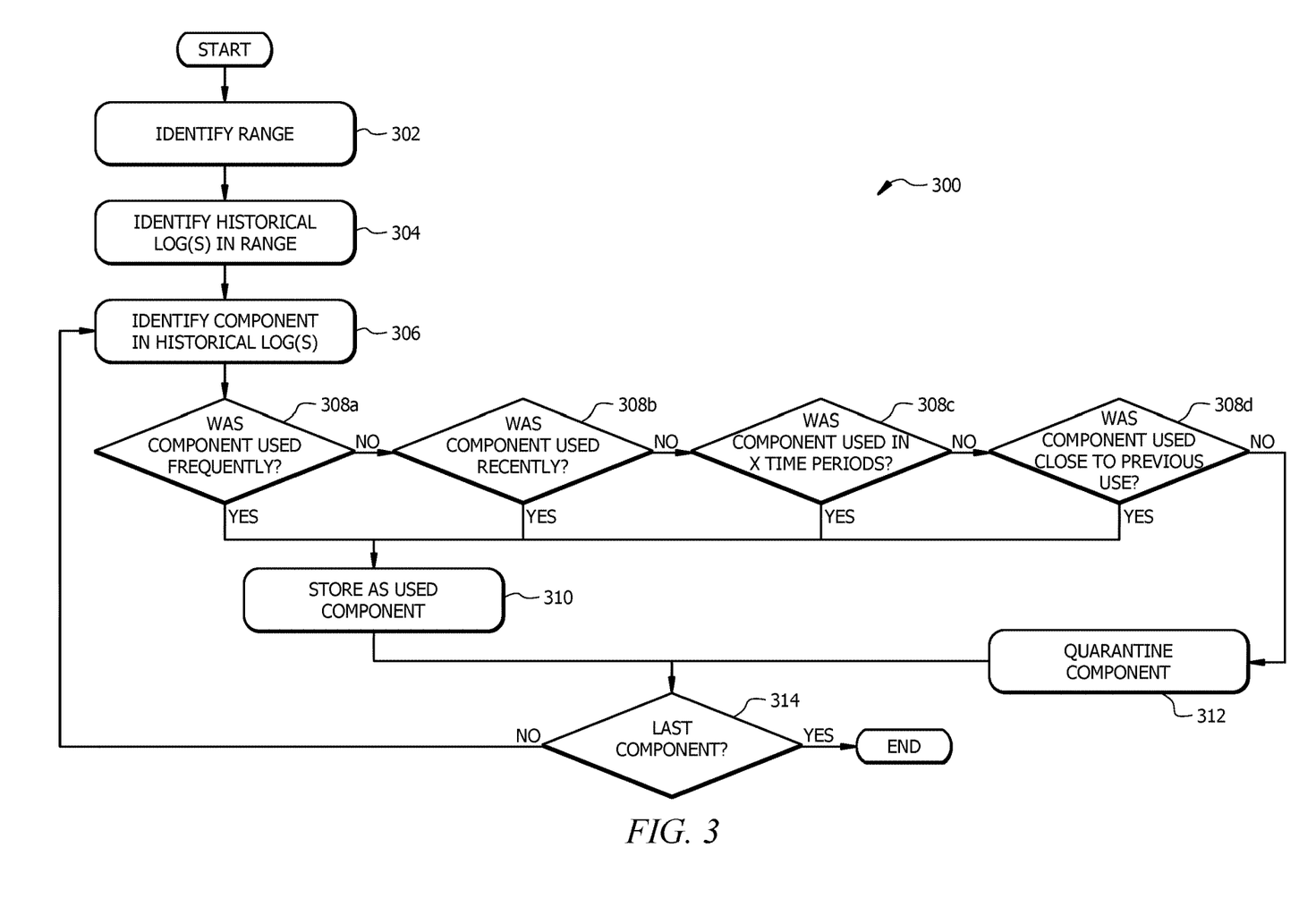
FIG. 3 is a flowchart illustrating a process by which the application monitoring system of FIG. 2 identifies unused components for quarantining from the memory.

Application monitoring system 30 determines a range of time for which components 16 in memory 10 are to be analyzed, identifies one or more historical logs 14a-14n associated with the range, searches historical logs 14a-14n to identify components 16 used by application 12 during the range, analyzes the usage for each component 16 identified in historical logs 14a-14n, classifies each component 16 as used component 16a or unused component 16b, and ensures components 16a used by application 12 are maintained in memory 10 and quarantines unused components 16b in quarantine memory 32, as described in further detail below, in the discussion of FIG. 3.

In some embodiments, application monitoring system 30 implements range determination module 206, historical log identification module 208, component identification module 210, relevance determination module 212 and isolation determination module 216.

Range determination module 206 may be implemented to determine a range of time over which components 16 in memory 10 are analyzed to determine if they are still used by application 12.

Historical log identification module 208 may be implemented to identify all historical log(s) 14a-14n associated with executions of application 12 during the range, as described in further detail below in the discussion of FIG. 3.

Figure 4:
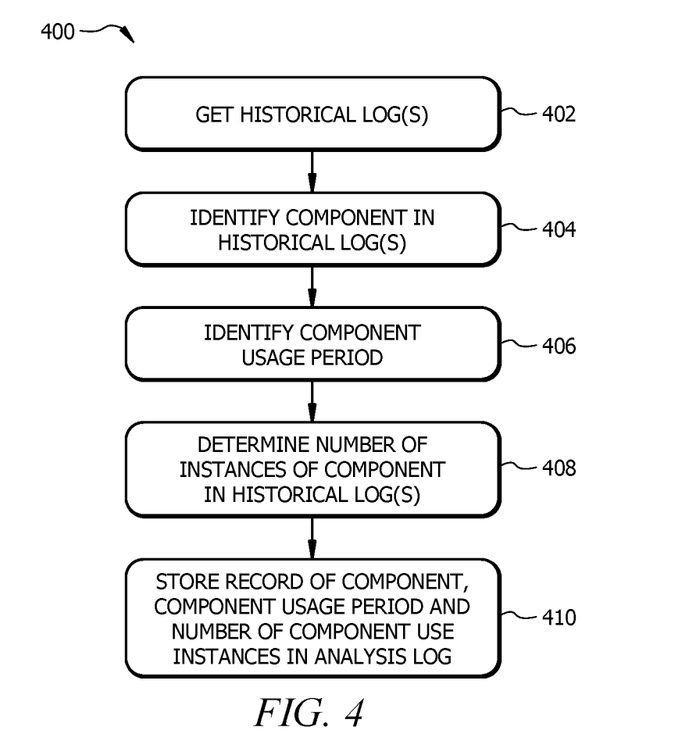
FIG. 4 is a flowchart of a process for identifying components in historical logs and determining usage of components stored in the memory.

Component identification module 210 may be implemented to identify all instances of usage of component 16 by application 12 that were recorded in historical logs 14a-14n, as described in further detail below, in the discussion of FIG. 4. Relevance determination module 212 may be implemented to determine a relevance of each component 16 in memory 10 based on the usage of components 16.

Figure 5:
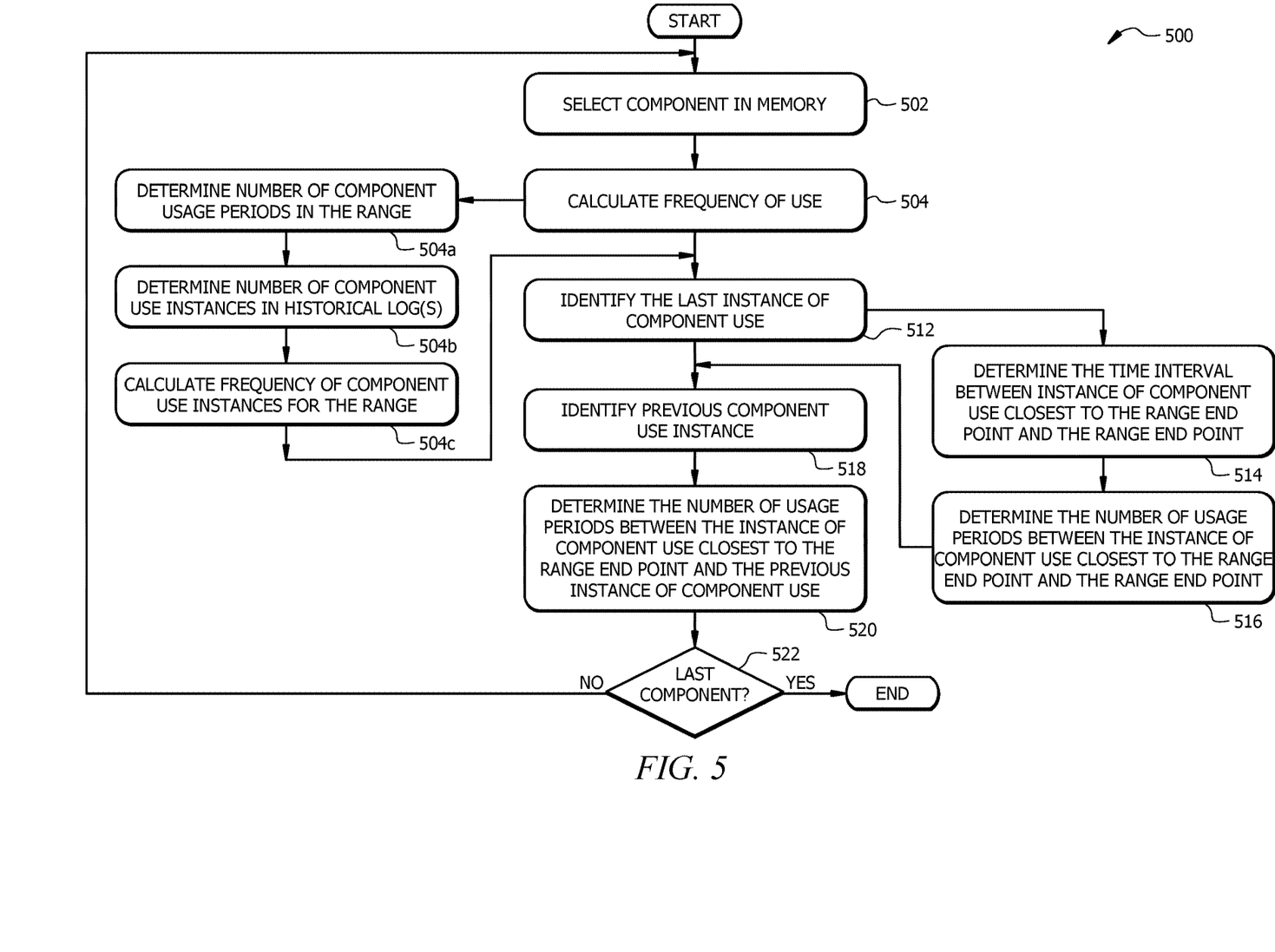
FIG. 5 is a flowchart of a process for determining relevance of one or more components stored in the memory.

In particular, embodiments may implement relevance determination module 212 to determine a frequency of use, a time interval from the most recent use of each component 16 to the range end point, the number of usage periods between the most recent use of component 16 and the range end point, and the number of usage periods between the most recent use of component 16 and the previous use of component 16, as described in further detail below, in the discussion of FIG. 5.

Figure 6:
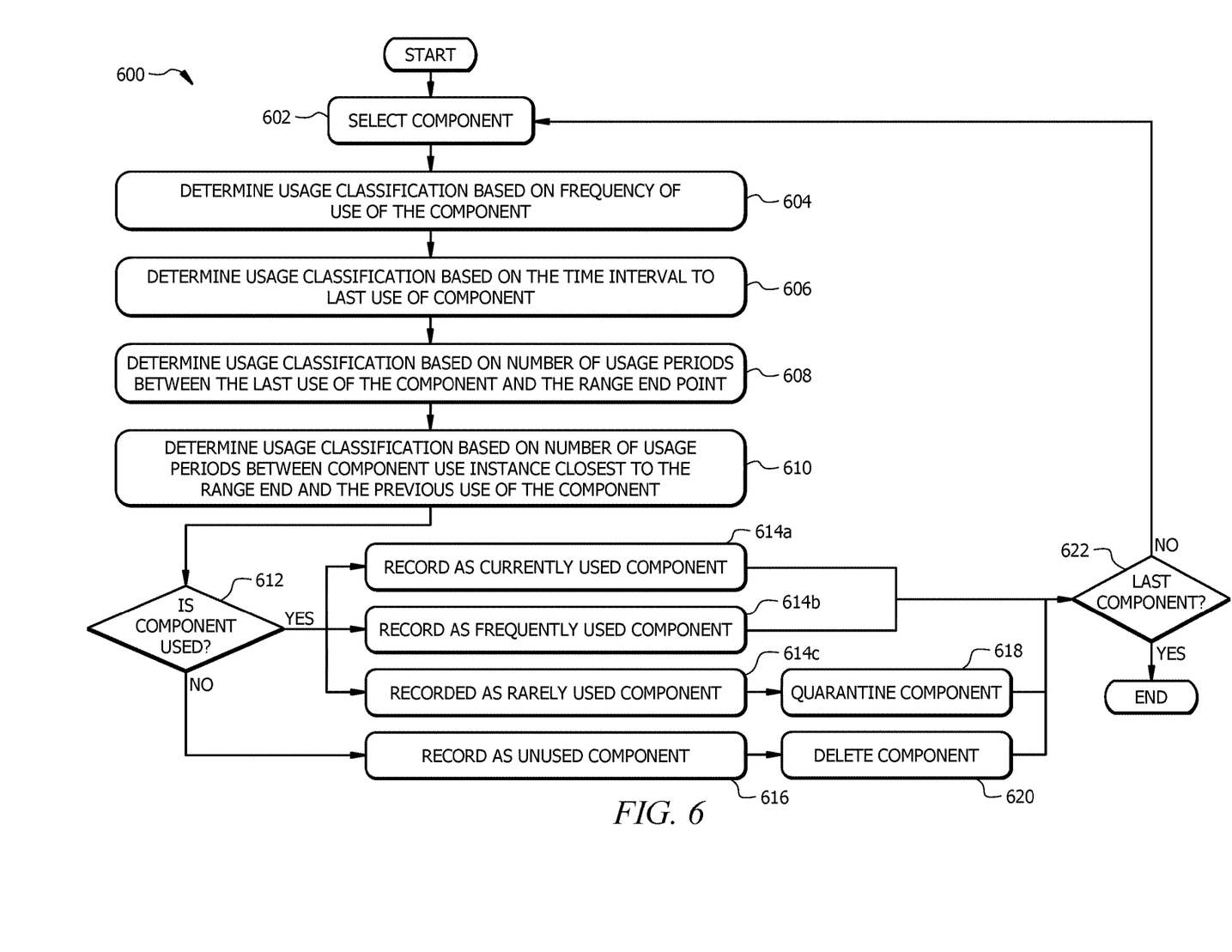
FIG. 6 is a flowchart of a process for isolating one or more components stored in the memory.

Isolation determination module 216 may be implemented to determine whether component 16 is still used by application 12 and should be maintained in memory 10 or is unused and should be quarantined as an unused component 16b in quarantine memory 32, as described in further detail below, in the discussion of FIG. 6.

In operation, application monitoring system 30 may execute instructions during an execution of application 12 or when a processor (not shown) associated with application 12 is idle. In some embodiments, processor 34 is configured to monitor application 12, memory 10 or a processor associated with application 12 or memory 10 and initiate an analysis of components 16 based on a notification from application 12, memory 10 or the processor associated with application 12 or memory 10. A notification may be scheduled or triggered. In some embodiments, processor 34 monitors memory 10 and determines that an analysis of components 16 used by application 12 should be initiated. For example, processor 34 may monitor memory 10 and determine memory 10 has exceeded a maximum storage threshold, or processor 34 may determine that one or more components 16 have been added or modified.

Application monitoring system 30 may execute range determination module 206 to determine a range of time as a basis for analyzing components 16. A range includes a range start point and a range end point. In some embodiments, during execution of range determination module 206, processor 34 searches memory 10 to determine a time/date stamp for a previous analysis of application 12 and uses that time/date stamp as the range start point. In some embodiments, an analysis of components 16 associated with application 12 is scheduled and the scheduled time/date stamp is used as the range end point and a time/date stamp for a previous analysis is used as the range start point. In some embodiments, an analysis of components 16 is triggered and a time/date stamp associated with the trigger event is used as the range end point.

Application monitoring system 30 may execute historical log identification module 208 to identify all historical logs 14a-14n that correspond to the range and that are stored in memory 10. During execution of historical log identification module 208, processor 34 may search memory 10 to identify historical logs 14a-14n with time/date stamps between the range start point and the range end point.

Application monitoring system 30 may execute component identification module 210 to search historical logs 14a-14n for records of component usage. During execution of component identification module 210, processor 34 may search historical logs 14a-14n or memory 10 for records of use of components 16, determine a usage period for each component 16, and determine the number of times each component 16 was used by application 12.

Application monitoring system 30 may execute a relevance determination module 212 to determine a component use frequency, a time interval from the range end point to the most recent use of component 16, a number of periods between the range end point and the most recent use of component 16, and a number of periods between the most recent use of component 16 and a previous use of component 16.

Application monitoring system 30 may store one or more analysis logs 214 corresponding to previously executed instances of an application monitoring process in memory 36.

Application monitoring system 30 may execute an isolation determination module 216 to analyze components 16 to determine which ones should be retained in memory 10 as used components 16a and identify any unused components 16b that should be quarantined in quarantine memory 32.

Quarantine memory 32 is separate from memory 10 and may be used to store rarely used or unused components 16b.

IV. Analyzing Components Based on Usage

FIG. 3 is a flowchart of a method for analyzing components 16 in memory 10 associated with application 12.

Process 300 begins at step 302 with application monitoring system 30 identifying a range of time to be used as a basis for analyzing components 16. A range has a range start point and a range end point. In some embodiments, application monitoring system 30 determines the current time/date is the range end point. In other embodiments, process 300 is scheduled or triggered and application monitoring system 30 determines the range end point based on the schedule. In some embodiments, the range start point may be based on a scheduled execution. For example, if application monitoring process 300 is scheduled to execute every thirty days, range determination module 206 may use the present day as the range end point and subtract thirty days to identify the range start point. In other embodiments, if application monitoring system 30 receives a notification that memory 10 allocated to application 12 exceeds a maximum storage limit, range determination module 206 may determine the range start point based on a previous execution of application monitoring process 300 or previous execution of range determination module 206. Application monitoring system 30 determines the range as the time interval between the range start point and the range end point. For example, if application 12 is scheduled to be analyzed on the first day of every month, range determination module 206 may identify the first day of the month as the range start point, identify the last day of the month as the range end point, and determine the range as the time interval between the first day of the month and the last day of the month.

At step 304, application monitoring system 30 executing historical log identification module 208 identifies a set of historical logs 14a-14n corresponding to the range. It should be noted that there can be variations in the number of historical logs 14a-14n for the range. For example, for an analysis of components 16 used by application 12 in the month of February, a range may have twenty-eight or twenty-nine instances of execution of application 12. Accordingly, the number of historical logs 14a-14n corresponding to the range will depend on the range start point and the range end point and may also depend on the calendar days between the range start point and the range end point.

At step 306, application monitoring system 30 executing component identification module 210 searches historical logs 14a-14n to identify records of use of components 16 by application 12 during the range.

At steps 308a-308d, application monitoring system 30 analyzes usage of component 16 during the range to determine if component 16 should be considered a used component 16a or unused component 16b.

At step 308a, application monitoring system 30 analyzes usage of component 16 to determine if component 16 was used frequently during the range. If component 16 was used frequently during the range, at step 310 application monitoring system 30 maintains component 16 in memory 10.

If component 16 was not used frequently, at step 308b, application monitoring system 30 analyzes usage of component 16 to determine if component 16 was used recently in the range. If component 16 was used recently during the range, at step 310 application monitoring system 30 maintains component 16 in memory 10.

If component 16 was not used recently, at step 308c, application monitoring system 30 analyzes usage of component 16 to determine if component 16 was used within a predefined number of usage periods relative to the range end point. Determining if component 16 was used within a predefined number of usage periods relative to the range end point may include determining the number of usage periods in the range. For example, if the range is six months (one-hundred eighty days), application monitoring system 30 may determine there are one hundred eighty daily usage periods, twenty-four weekly usage periods, six monthly usage periods, two quarterly usage periods and one semi-annual usage period. If component 16 was used within a predefined number of usage periods relative to the range end point, at step 310 application monitoring system 30 maintains component 16 in memory 10.

If component 16 was not used within a predefined number of usage periods relative to the range end point, at step 308d, application monitoring system 30 analyzes usage of component 16 to determine if component 16 was used within a predefined number of usage periods relative to a previous use of component 16. If component 16 was used within a predefined number of usage periods relative to a previous use of component 16, at step 310 application monitoring system 30 maintains component 16 in memory 10.

If application monitoring system 30 determines at step 308a that component 16 was not used frequently, determines at step 308b that component 16 was not used recently, determines at step 308c that component 16 was not used within a predefined number of usage periods relative to the range end point, and determines at step 308d that component 16 was not used within a predefined number of usage periods relative to a previous use of component 16, then at step 312 application monitoring system 30 quarantines component 16b in quarantine memory 32.

At step 314, application monitoring system 30 determines if component 16 was the last one to be analyzed. If so, then process 300 ends. Otherwise, application monitoring system 30 continues analyzing components 16 in memory 10.

V. Identifying Component Records in Historical Logs

Analyzing usage of components 16 during the range requires information about the usage period for each component 16 and the number of times each component 16 was used by application 12 during the range. Embodiments disclosed herein search historical logs 14a-14n to identify records of components 16 used by application 12 during previous execution instances, determine the usage period for each component 16 and determine the number of times each component 16 was used during the range.

Process 400 for identifying usage of components 16 by application 12 during a range begins at step 402 when application monitoring system 30 identifies a set of historical logs 14a-14n associated with the range.

At step 404, application monitoring system 30 searches the set of historical logs 14a-14n to identify all components 16 used at least once during the range.

At step 406, application monitoring system 30 identifies the usage period for each component 16 identified in the set of historical logs 14a-14n. Notably, each component 16 listed in any of the set of historical logs 14a-14n may have a usage period that is shorter, the same, or longer than the range. For example, application 12 executed on the last day of December may use components 16 with daily, weekly and monthly usage periods because it is the last day of a month, but may also use components 16 with quarterly, semi-annual and annual usage periods.

At step 408, application monitoring system 30 determines the number of times each component 16 was used based on records identified in the set of historical logs 14a-14n. In some embodiments, when application monitoring system 30 executing component identification module 210 identifies an instance of component 16 recorded in any of historical logs 14a-14n, processor 34 records the instance in the set of analysis logs 214, and further associates a time/date stamp or other chronological tag with the instance.

Process 400 stops after step 410 when application monitoring system 30 stores in analysis logs 214 a record of each component 16 identified in any of historical log 14a-14n, an associated usage period and the total number of instances of use for component 16 during the range.

VI. Determining Component Relevance Based on Usage

Embodiments disclosed herein use intelligent methods for determining whether a component 16 is used by application 12 or whether the component 16 should be classified as unused component 16b and quarantined in quarantine memory 32. FIG. 5 is a flowchart of an embodiment of a process for determining relevance for components 16 associated with application 12.

Process 500 for determining whether component 16 is relevant to application 12 starts at step 502 when application monitoring system 30 selects a component 16 stored in memory 10.

At step 504, application monitoring system 30 determines the frequency of use of component 16. Determining the frequency of use may involve steps 504a, 504b and 504c. At step 504a, application monitoring system 30 determines the number of usage periods in the range for the selected component 16. For example, if component 16 has a daily usage period and the range is thirty days, application monitoring system 30 may determine there are thirty usage periods for component 16. In some embodiments, application monitoring system 30 determines the number of usage periods in the range based on the calendar dates. For example, if application monitoring system 30 is scheduled to monitor usage of component 16 on a monthly basis, application monitoring system 30 may determine there are thirty-one usage periods in January but twenty-eight or twenty-nine usage periods in February.

The number of instances of component 16 being used by application 12 may be the same as, fewer than, or more than the number of usage periods in a range. At step 504b, application monitoring system 30 determines the number of component use instances in the range based on information recorded in the set of historical logs 14a-14n. In some embodiments, the total number of component use instances for component 16 for the range is retrieved from analysis logs 214 stored in memory 10 or by processor 34 executing component identification module 210.

At step 504c, application monitoring system 30 calculates the frequency of use of component 16 for the range based on a ratio of the number of instances of component 16 in the range divided by the number of usage periods in the range for component 16. For example, in a twenty-eight day range, if component 16 is associated with a daily usage period and is used twenty-one times, application monitoring system 30 may calculate that component 16 is used in 75% of the usage periods in the range.

At step 512, application monitoring system 30 identifies the last (most recent) instance that component 16 was used by application 12. In some embodiments, application monitoring system 30 searches historical logs 14a-14n or analysis logs 214 to identify a time/date stamp associated with each instance that component 16 was used by application 12 and determines which instance of component 16 is the closest to the range end point.

At step 514, application monitoring system 30 determines the time interval between the range end point and a time associated with the most recent instance that component 16 was used by application 12 (the component use instance determined in step 512). In some embodiments, processor 34 identifies which instance of component 16 is the closest to the range end point, identifies a time associated with the instance, and calculates a time interval between the instance and the range end point. For example, a most recent component use instance may be approximately five days before the range end point.

At step 516, application monitoring system 30 determines the number of usage periods between the range end point and the most recent instance that component 16 was used by application 12 (the component use instance determined in step 512). For example, if component 16 is associated with a monthly usage period and was last used 45 days before the range end point, application monitoring system 30 may determine the number of usage periods between the most recent instance that component 16 was used by application 12 and the range end point is one period.

At step 518, application monitoring system 30 determines the instance of use of component 16 previous to the most recent instance of use of component 16. In some embodiments, processor 34 searches historical logs 14a-14n or analysis logs 214 to identify the instance of use of component 16 immediately preceding the most recent component use instance. For example, application monitoring system 30 may identify (at step 512) the most recent use of component 16, determine from a time/date stamp that the most recent use of component 16 was on a Monday and search analysis logs 214 to determine the previous use of component 16 was on the preceding Friday.

At step 520, application monitoring system 30 determines the number of usage periods between the most recent use of component 16 and the preceding use of component 16. Using the example described with respect to step 518, application monitoring system 30 may determine the most recent use of component 16 occurred on a Monday and determine the previous use of component 16 occurred on the preceding Friday. In this situation, if component 16 is associated with a daily usage period, processor 34 may determine the most recent use of component 16 is separated from the previous use of component 16 by two usage periods. At step 522, the application monitoring system 30 determines if the component 16 is the last component. If not, the process 500 returns to step 502. If so, process 500 ends.

VII. Determining Component Usage Classification

Embodiments disclosed herein use intelligent methods for determining whether to quarantine unused components 16b from memory 10. FIG. 6 is a flowchart of an embodiment of a process for classifying components 16 associated with application 12 to determine whether to keep a component 16a that is being used and quarantine a component 16b that is not being used.

Process 600 for determining whether to delete or isolate component 16 begins at step 602 when application monitoring system 30 identifies component 16 in memory 10 for classifying based on component usage.

At step 604, application monitoring system 30 determines a usage classification based on the frequency that component 16 is used (described above at step 504). A usage classification based on frequency may also depend on the range. For example, component 16 associated with a daily component usage period may have been used twenty-one times over the course of twenty-eight days in February (a frequency of 75%) such that processor 34 classifies component 16 as a currently used component 16a. However, if the same component 16 is used one-hundred thirty-five times in a one-hundred-eighty day range (also a 75% frequency), processor 34 may classify component 16 as a frequently used component 16*a*. A usage classification based on frequency may have thresholds. For example, for components 16 with daily usage periods, a "currently used" threshold may correspond to a frequency greater than 70%, a "frequently used" threshold may correspond to a frequency greater than 50%, a "rarely used" threshold may correspond to a frequency less than 50% but greater than 10%, and an "unused" threshold may correspond to a frequency less than 10%.

Classifying components 16 based on frequency may be possible for any range that is greater than the usage period for component 16. For example, components 16 associated with a monthly usage period are expected to be used at least once in a one-month range. However, if the range is less than one month, there is a possibility that component 16 was not used in the range (a 0% frequency). At step 606, application monitoring system 30 determines a usage classification for component 16 based on the time interval between the range end point and the most recent use of component 16. Usage classification of components 16 based on the time interval may have thresholds. For example, for components 16 with associated weekly component usage periods, a "currently used" threshold may correspond to a time interval less than three weeks, a "frequently used" threshold may correspond to a time interval less than two months, a "rarely used" threshold may correspond to a time interval less than one quarter, and an "unused" threshold may correspond to a time interval greater than three months.

At step 608, application monitoring system 30 determines a usage classification for component 16 based on the number of usage periods between the range end point and the component use instance closest to the range end point. A usage classification for component 16 based on the number of usage periods between the most recent use of component 16 and the range end point may depend on the component usage period.

For example, for components 16 with associated daily component usage periods, a "currently used" threshold may correspond to less than three usage periods, a "currently used" threshold may correspond to less than five usage periods, a "rarely used" threshold may correspond to less than ten usage periods, and an "unused" threshold may correspond to a usage greater than 10 usage periods.

At step 610, application monitoring system 30 determines a usage classification based on the number of usage periods between the most recent use of component 16 (the instance closest to the range end point) and the previous use of component 16 (determined in step 520). For example, if component 16 is associated with a daily usage period and was most recently used on a Monday, component 16 may be classified as "currently used" if the previous use was on the preceding Friday (e.g. within three usage periods), component 16 may be classified as "frequently used" if the previous use was on the preceding Monday (e.g. executed within six usage periods), component 16 may be classified as "rarely used" if the previous use occurred within fourteen usage periods, and may be classified as "unused" if the previous use was more than thirty days.

Using each of these usage classifications, at step 612, application monitoring system 30 uses these classifications to determine if component 16 should be classified as used component 16*a* or unused component 16*b*. Application monitoring system 30 may rely on one classification more than others. For example, application monitoring system 30 may classify components 16 with daily usage periods based only on frequency but may classify components 16 with monthly usage periods based on the frequency and the time interval between the most recent use of component 16 and the range end point.

At any of steps 614*a*-614*c*, component 16 is determined to be used by application. At step 614*a*, if application monitoring system 30 classifies component 16*a* as a currently used component, a record of component 16*a* and a currently used classification may be stored in analysis log 214. Alternatively, at step 614*b*, if application monitoring system 30 classifies component 16*a* as a frequently used component, a record of component 16*a* and a frequently used classification may be stored in analysis log 214. Alternatively, at step 614*c*, if application monitoring system 30 classifies component 16*b* as a rarely used component, a record of component 16*b* and a rarely used classification may be stored in analysis log 214.

To guard against unwanted connectivity, rarely used components 16*b* may be quarantined from memory 10. At step 618, application monitoring system 30 may remove unused components 16*b* from memory 10 and store rarely used components 16*b* in quarantine memory 32.

At step 616, if application monitoring system 30 determines component 16 should be classified as an unused component 16*b*, a record of component 16*b* and an unused classification may be stored in analysis log 214. In some embodiments, at step 620 application monitoring system 30 deletes unused components 16*b* from application memory 10.

At step 622, application monitoring system 30 determines if there are other components 16 in memory 10 to be analyzed. Process 600 ends when all components 16 in memory 10 have been analyzed.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An application monitoring system for identifying and removing unused components from memory associated with an application, the system comprising:

a range determination module implemented by one or more hardware processors and configured to determine a range start time and a range end time;
a historical log identification module implemented by the one or more hardware processors and configured to identify a set of historical logs for the range, each historical log corresponding to one execution of the application;
a component identification module implemented by the one or more hardware processors and configured to:
identify all components recorded at least once in the set of historical logs; and
for each component identified in the set of historical logs:
determine a number of uses of the component in the set of historical logs;
identify a usage period associated with the component;
determine a number of usage periods in the range for the component;
determine a frequency of use of the component based on the number of instances of use of the component and the number of usage periods in the range;
determine a time interval between the range end point and a component use closest to the range end point;
determine a number of usage periods between the range end point and the component use closest to the range end point; and
determine a number of usage periods between the component use closest to the range end point and a component use immediately preceding the component use closest to the range end point; and
a component classification module implemented by the one or more hardware processors and configured to:
for each component identified in the set of historical logs:
determine a usage classification based on the frequency of use of the component, the time interval between the range end point and the component use closest to the range end point, the number of usage periods between the range end point and the component use closest to the range end point, and the number of usage periods between the component use closest to the range end point and the component use immediately preceding the component use closest to the range end point;
wherein the application monitoring system is further configured to:
monitor one or more of the application, a memory storing the application and a processor associated with the application; and
identify and remove unused components from the memory when one or more of a new component is added to the memory, a component is deleted from the memory, a component is modified, the memory exceeds a maximum storage size, and the processor associated with the application is idle.

2. The application monitoring system of claim 1, further comprising a set of analysis logs configured to store a record of the range, a record of the set of historical logs identified, a record of each component identified in the set of historical logs, a record of the number of component uses for each component identified in the set of historical logs, and a record of the usage classification for each component identified in the set of historical logs.

3. The application monitoring system of claim 1, wherein the usage classification comprises one of a currently used component, a frequently used component, a rarely used component and an unused component.

4. The application monitoring system of claim 3, wherein:
the application monitoring system comprises a quarantine memory; and
the component classification module is configured to store rarely used components and unused components in the quarantine memory.

5. A system for determining usage classification for one or more components in a memory associated with an application, the system comprising:
a range determination module implemented by one or more hardware processors communicatively coupled to the memory, the range determination module configured to determine a range start point and a range end point for analyzing usage of components associated with the application;
a historical log identification module implemented by the one or more hardware processors and configured to search the memory for a set of historical logs associated with the range;
a component identification module implemented by the one or more hardware processors and configured to identify one or more components referenced at least once in the set of historical logs;
a relevance determination module implemented by the one or more hardware processors and configured to:
for each component identified in the set of historical logs:
determine a number of usage periods in the range; and
determine a frequency of use of the component for the range, a time interval between the range end point and a component use instance closest to the range end point, a number of usage periods between the range end point and the component use closest to the range end point, and a number of usage periods between the component use closest to the range end point and a previous component use immediately preceding the component use closest to the range end point; and
an isolation determination module implemented by the one or more hardware processors and configured to determine, for each component, a usage classification based on the frequency of component use, the time interval between the range end point and the component use closest to the range end point, the number of usage periods between the range end point and the component use closest to the range end point, and the number of usage periods between the component use closest to the range end point and the previous component use, wherein the usage classification comprises one of a currently used component, a frequently used component, a rarely used component and an unused component;
wherein the system is further configured to:
monitor one or more of the application, the memory storing the application and a processor associated with the application; and
identify and remove unused components from the memory when one or more of a new component is added to the memory, a component is deleted from the memory, a component is modified, the memory exceeds a maximum storage size, and the processor associated with the application is idle.

6. The system for determining usage classification of claim 5, wherein the isolation determination module is configured to store one or more of rarely used components and unused components in a quarantine memory based on the usage classification.

7. The system for determining usage classification of claim 5, wherein:
the component identification module is configured to identify a reference component referenced by an executable component; and
the relevance determination module is configured to determine a usage classification for the reference component based on a usage classification for the executable component.

8. The system for determining usage classification of claim 5, wherein:
the component identification module is configured to identify an executable component that references a reference component; and
the relevance determination module is configured to determine a usage classification for the executable component based on a usage classification for the reference component.

9. The system for determining usage classification of claim 5, wherein:
the isolation determination module is configured to:
determine a first usage classification based on the frequency of component use;
determine a second usage classification based on the time interval between the range end point and the component use closest to the range end point;
determine a third usage classification based on the number of usage periods between the range end point and the component use closest to the range end point; and
determine a fourth usage classification based on the number of usage periods between the component use closest to the range end point and the previous component use; and
determine the component classification based on the component usage period and one of the first usage classification, the second usage classification, the third usage classification or the fourth usage classification.

10. An application monitoring system for identifying and removing unused components from a memory associated with an application, the system comprising a processor configured to execute:
a range determination module to determine a range having a range start point and a range end point;
a historical log identification module configured to search the memory associated with the application for a set of historical logs corresponding to the range;
a component identification module configured to identify one or more components referenced at least once in the set of historical logs corresponding to the range;
a relevance determination module configured to:
determine, for each component identified in the set of historical logs, a number of usage periods in the range; and
determine a usage classification based on a frequency of use of the component for the range, a time interval between the range end point and a component use closest to the range end point, a number of usage periods between the range end point and the component use closest to the range end point, and a number of usage periods between the component use closest to the range end point and a previous component use immediately preceding the component use closest to the range end point; and
an isolation determination module configured to:
quarantine any unused component from the memory associated with the application;
wherein the application monitoring system is further configured to:
monitor one or more of the application, the memory storing the application and the processor associated with the application; and
identify and remove unused components from the memory when one or more of a new component is added to the memory, a component is deleted from the memory, a component is modified, the memory exceeds a maximum storage size, and the processor associated with the application is idle.

11. The application monitoring system of claim 10, further configured to store in a set of analysis logs a record associated with the range, wherein the record comprises each component analyzed by the application monitoring system and a component classification for each component associated with the application.

12. The application monitoring system of claim 10, further configured to:
assign a first usage classification to one or more components based on a first frequency associated with a first range; and
assign a second usage classification to the one or more components based on a second frequency associated with a second range.

13. The application monitoring system of claim 10, further configured to:
assign a first usage classification to one or more components associated with a first usage period based on a first frequency associated with the range; and
assign a second usage classification to the one or more components associated with a second usage period based on a second frequency associated with the range.

* * * * *